March 3, 1959 R. J. HUMBERT 2,875,679
SMOKER'S LAMP
Filed July 11, 1958
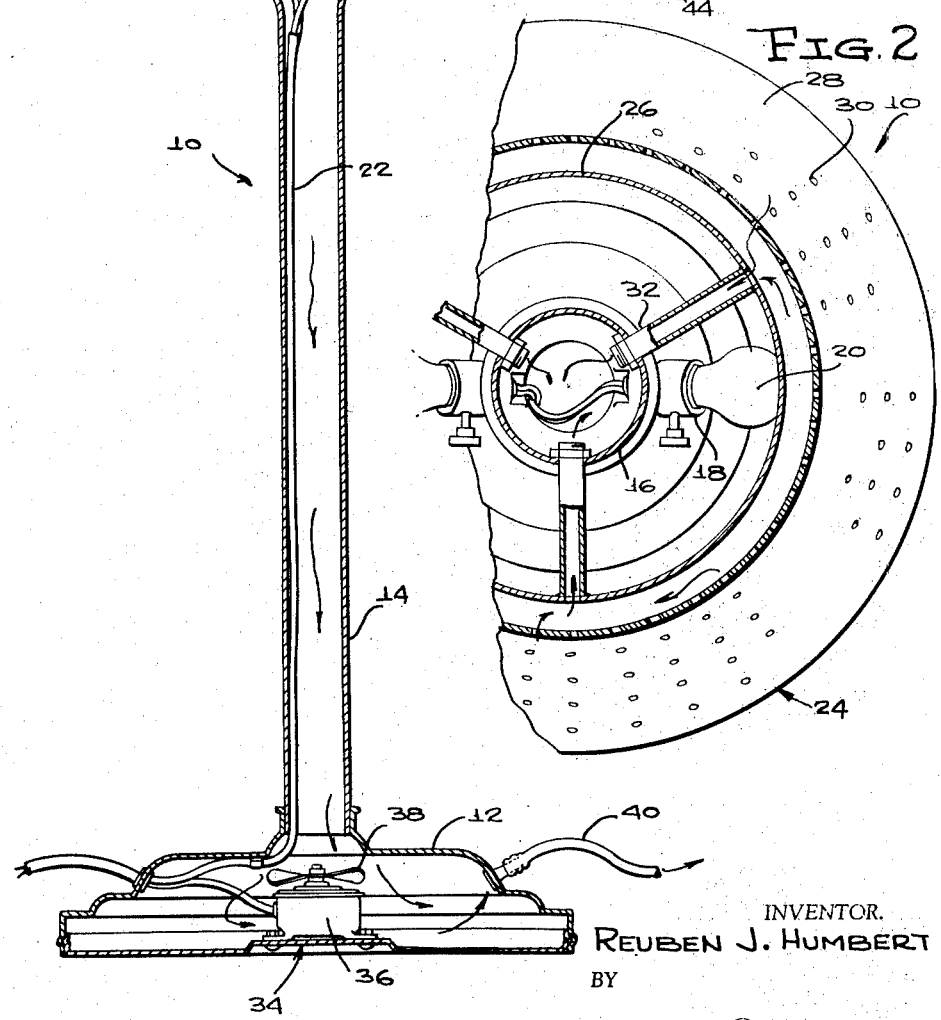
INVENTOR.
REUBEN J. HUMBERT
BY
McMorrow, Berman & Davidson
ATTORNEYS

United States Patent Office 2,875,679
Patented Mar. 3, 1959

2,875,679

SMOKER'S LAMP

Reuben J. Humbert, Coos Bay, Oreg.

Application July 11, 1958, Serial No. 747,955

2 Claims. (Cl. 98—43)

The present invention relates to lamps generally and in particular to a lamp for use by a smoker.

An object of the present invention is to provide a lamp having means thereon for withdrawing smoke-laden air from an enclosure such as a room and for expelling the smoke-laden air to the exterior of the room.

Another object of the present invention is to provide a smoker's lamp of conventional appearance which lends itself to clearing of smoke-laden air from an enclosure in an unobtrusive manner.

A further object of the present invention is to provide a smoker's lamp for withdrawing stagnant air from an enclosure which is sturdy in construction, simple in structure, one economical to manufacture and assemble, and one which is highly effective in action.

These and other objects and advantages of the present invention will be fully apparent from the following description when taken in conjunction with the annexed drawing, in which:

Figure 1 is an elevational view in section of the lamp of the present invention; and Figure 2 is a view taken on the line 2—2 of Figure 1.

Referring to the drawing, the reference numeral 10 designates generally the smoker's lamp according to the present invention. The lamp comprises a hollow base 12 having a standard 14 rising from the central portion thereof. The standard 14 is hollow and carries on its upper end a hollow dome 16.

A plurality of sockets 18 project outwardly from the lower end portion of the dome 16 and each carries an incandescent lamp bulb 20. A pair of wires 22 connect each socket 18 with an external source of current, the wires 22 extending downwardly through the standard 14 and out through an aperture provided in the base 12 inwardly of the rim thereof.

A ventilating shade assembly 24 surrounds the dome 16 and is spaced therefrom. The shade assembly 24 consists in an inner wall 26 arranged in an upwardly sloping direction and an outer wall 28 circumposed about and spaced from the inner wall 26. The inner wall 26 and outer wall 28 form a closed ended shell conformably shaped to a lamp shade.

The outer wall 28 is provided with a plurality of spaced apertures 30 each constituting an ingress opening for stagnant air and smoke-laden air which may surround the shell of the assembly 24.

The shell of the assembly 24 is arranged in an upright direction and is spaced from the dome 16 with a plurality of spaced conduits 32 extending between the dome 16 and the shell of the assembly 24. The opposed ends of the conduits 32 support the shell of the assembly 24 and are connected in communication with the interior of the dome 16 and with the interior of the shell between the inner wall 26 and outer wall 28.

Such a means is provided in the base 12 in communication with the interior of the standard 14. Such means consists in an electric fan 34 having a motor 36 mounted upon the interior bottom wall of the base 12 and having its blade 38 positioned in registry with the lower end of the standard 14 and arranged so as to draw air from the interior of the standard 14 and force the same outwardly of the motor 36 for withdrawal from the base 12 by a conduit 40. The conduit 40 constitutes exhaust means operatively connected to the base 12 for withdrawing the stagnant air from the base 12.

The fan 34 may be eliminated and the conduit 40 connects directly to a source of suction exteriorly of the enclosure within which the lamp 10 of the present invention is installed.

In use, the lamp 10 of the present invention may be installed in any enclosure or room in which smoke-laden air is found to be objectionable and upon operation of the suction means the smoke-laden air will be drawn through the apertures 30 in the outer wall 28 of the shell of the assembly 24 and through the conduits 32 into the dome 16 from whence it will be drawn down the interior of the standard 14 into the base 12 and discharged through the conduit 40. The lamp 10 may be formed as a floor lamp or a desk lamp or table lamp as desired and of such rigid materials as to withstand the reduced pressure when the suction means is operating. The means connecting the inner wall 26 to the outer wall 28 may be any means found practical. The means here illustrated is an upper outwardly turned flange 42 projecting from the upper end of the shell inner wall 26 and another outwardly turned flange 44 projecting from the lower end of the inner wall 26. The flanges 42 and 44 have their free ends formed with a groove into which extends an inwardly turned portion of the outer wall 28, as at 46 with reference to the flange 44.

What is claimed is:

1. In a smoker's lamp, the combination of a hollow base, a hollow standard rising from said base, and a hollow dome closing the upper end of said standard, of a ventilating shade assembly surrounding said dome, said assembly comprising a closed ended shell conformably shaped to a lampshade and including an inner wall and an outer wall spaced from the inner wall, one of said walls being provided with apertures, said shell being arranged in an upright direction and spaced from said dome, a plurality of spaced conduits extending between said dome and said shell and having the opposing ends connected in communication with the interiors of said dome and said shell respectively, and exhaust means operatively connected to said base for withdrawing the stagnant air from said base.

2. In a smoker's lamp, the combination of a hollow base, a hollow standard rising from said base, and a hollow dome closing the upper end of said standard, of a ventilating shade assembly surrounding said dome, said assembly comprising a closed ended shell conformably shaped to a lampshade and including an inner wall and an outer wall spaced from the inner wall, one of said walls being provided with apertures, said shell being arranged in an upright direction and spaced from said dome, a plurality of spaced conduits extending between said dome and said shell and having the opposing ends connected in communication with the interiors of said dome and said shell respectively, suction means in said base and in communication with the interior of said standard, and exhaust means operatively connected to said base for withdrawing the stagnant air from said base.

References Cited in the file of this patent

UNITED STATES PATENTS

| | | |
|---|---|---|
| 1,405,106 | Edge | Jan. 31, 1922 |
| 1,555,579 | Howell | Sept. 29, 1925 |